United States Patent [19]

Tsuneda

[11] Patent Number: 4,805,713
[45] Date of Patent: Feb. 21, 1989

[54] POWER TRANSMITTING SYSTEM FOR A FOUR-WHEEL DRIVE VEHICLE

[75] Inventor: Masaaki Tsuneda, Kokubunji, Japan

[73] Assignee: Fuji Jukogyo Kabushiki Kaisha, Tokyo, Japan

[21] Appl. No.: 128,227

[22] Filed: Dec. 3, 1987

[30] Foreign Application Priority Data

| Dec. 12, 1986 | [JP] | Japan | 61-297215 |
| Dec. 12, 1986 | [JP] | Japan | 61-297216 |
| Dec. 12, 1986 | [JP] | Japan | 61-297217 |
| Dec. 12, 1986 | [JP] | Japan | 61-297218 |

[51] Int. Cl.$^4$ .............................................. B60K 17/00
[52] U.S. Cl. ........................................ 180/70.1; 180/248
[58] Field of Search ................................ 180/70.1, 248

[56] References Cited

U.S. PATENT DOCUMENTS

| 4,572,318 | 2/1986 | Cady | 180/248 |
| 4,721,011 | 1/1988 | Kubo et al. | 180/248 |

FOREIGN PATENT DOCUMENTS

| 63525 | 4/1983 | Japan | 180/248 |
| 59-81224 | 5/1984 | Japan . | |

Primary Examiner—Kenneth R. Rice
Attorney, Agent, or Firm—Martin A. Farber

[57] ABSTRACT

A four-wheel drive vehicle has a laterally disposed engine, a transmission, and a planetary gear device for transmitting power of an engine to front and rear wheels of the vehicle. The planetary gear device is provided at a position between the engine and the transmission.

10 Claims, 4 Drawing Sheets

POWER TRANSMITTING SYSTEM FOR A FOUR-WHEEL DRIVE VEHICLE

BACKGROUND OF THE INVENTION

The present invention relates to a system for transmitting the power of an engine to four wheels of a four-wheel drive vehicle and more particularly to an arrangement of a central differential in the system.

In a conventional four-wheel drive vehicle having a central differential, which is called a full time four-wheel drive vehicle, the central differential operates to uniformly distribute the torque of an engine to front wheels and to rear wheels of the vehicle. In order to provide a compact transmission system and to decrease the height of the vehicle, the central differential is disposed inside a transmission case.

Japanese Patent Laid-Open No. 59-81224 discloses such a transmission system for a vehicle having a laterally mounted engine. In the system, a planetary gear device as a central differential is disposed in alignment with an output shaft of the transmission at a side opposed to the engine with respect to the transmission. A sun gear of the planetary gear device is connected to front wheels through a shaft co-axially provided in the output shaft. A carrier is connected to the rear wheels through reduction gears, offset shaft, and so forth.

However, in the system of the prior art, since the central differential is disposed at a side of the transmission opposite to the engine and away from the center line with respect to the width of the vehicle, long shafts are necessary for transmitting the power from the central differential to the front and rear transmission systems. Thus, the construction of the transmission system becomes complicated. Furthermore, in some vehicles, overdrive speed gears cannot be easily added to the transmission because the central differential takes up the space for them.

SUMMARY OF THE INVENTION

The object of the present invention is to provide a transmission system having a central differential within a transmission case and arranged to simplify the construction thereof and to reduce the space occupied by the system.

According to the present invention, there is provided a power transmitting system for a four-wheel drive vehicle having a laterally disposed engine, a transmission, and a central differential device for transmitting power of an engine to front and rear wheels, characterized in that the central differential device is provided at a position between the clutch housing and the transmission.

In an aspect of the invention, the central differential is a planetary gear device, a carrier of the planetary gear device is secured to the output shaft of the transmission, and a sun gear and a ring gear of the planetary gear device are arranged as output members, respectively.

In another aspect of the invention, the ring gear is secured to the output shaft of the transmission, and sun gear and carrier are arranged as output members, respectively.

The other objects and features of this invention will become understood from the following description with reference to the accompanying drawings.

DETAILED DESCRIPTION OF THE PREFERRED EMBODIMENT

Figure 1:
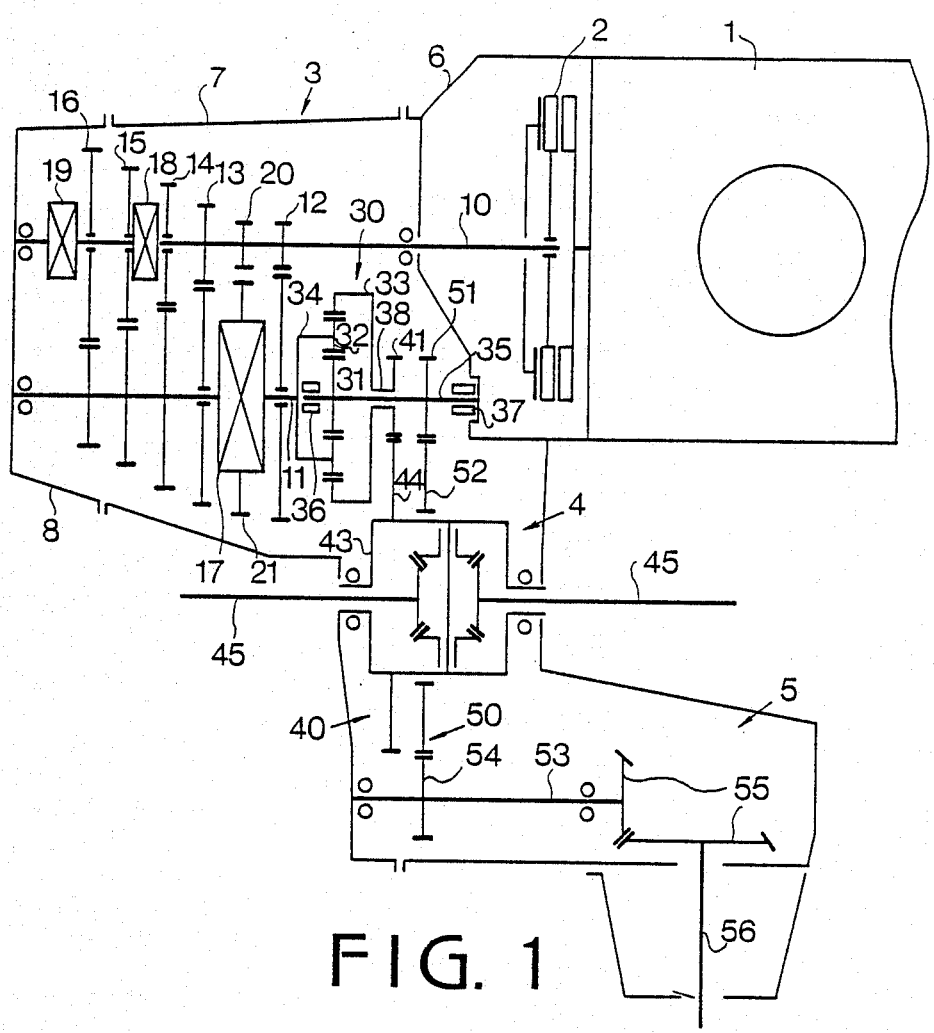
FIG. 1 is a schematic diagram of a four-wheel drive power transmission system in a first embodiment of the present invention.

FIG. 1 shows a power transmission system for a four-wheel drive motor vehicle to which the present invention is applied. An engine 1 is laterally mounted on the motor vehicle at a front portion thereof. The power transmission system comprises a clutch 2 housed in a clutch housing 6, transmission 3 and transfer 5, the latter two housed in a transmission case 7 and an extension case 8. The transmission 3 has an input shaft 10, an output shaft 11 parallel with the input shaft 10, five pairs of change-speed gear 12 to 16 corresponding to first to fifth (overdrive) speed gears, and synchronizers 17 to 19. The synchronizers 17 to 19 are disposed between the gears 12 and 13, between 14 and 15 and adjacent the gears 16, respectively. A reverse drive gear 20 mounted on the input shaft 10 meshes with a gear 21 formed on one side of a sleeve of the synchronizer 17 through an idler gear (not shown) for reverse drive.

The transfer device 5 has a planetary gear device 30 and a front differential 4. The planetary gear device 30 is disposed between the transmission 3 and the clutch 2 and serves as a central differential. The planetary gear device 30 comprises a sun gear 31, a ring gear 33 having internal teeth, planet pinions 32 in mesh with both gear 31 and the internal teeth of ring gear 33, and a carrier 34 supporting the pinions 32. The carrier 34 is connected with the output shaft 11. The sun gear 31 is fixedly mounted on a sun gear shaft 35 which is aligned with the output shaft 11 and supported by bearings 36, 37. The ring gear 33 is connected through a tubular shaft 38 to a drive gear 41 rotatably mounted on the sun gear shaft 35.

The drive gear 41 meshes with a driven gear 44 integral with a differential case 43 of front differential 4, thereby forming final reduction gear device 40. The front differential 4 is connected to left and right axle shafts 45 of the vehicle so as to transmit the power to front wheels (not shown) of the vehicle.

A drive gear 51 of transfer gear device 50 securely mounted on the sun gear shaft 35 meshes with an idler gear 52 rotatably mounted on the differential case 43. The idler gear 52 engages a driven gear 54 securely mounted on a transfer shaft 53 of the transfer device 5. The transfer shaft 53 is connected to a rear drive shaft 56 of the vehicle perpendicular to the transfer shaft 53 through a pair of bevel gears 55, thereby transmitting the power to rear wheels of the vehicle by way of a propeller shaft (not shown).

The power of the engine 1 from an output axle thereof is transmitted to the transmission 3 through the clutch 2 and the input shaft 10 and further to the carrier 34 of the planetary gear device 30 through the output shaft 11. The torque is transmitted to the front wheels through ring gear 33, final reduction gear device 40, front differential 4 and axle shafts 45. The torque is transmitted to the rear wheels through ring gear 32, transfer gear device 50, transfer shaft 53 and rear drive shaft 56. The difference between the speed of the front and rear wheels is absorbed as the planet pinions 32 walk around the sun gear 31 and on the ring gear 33. Thus, the planetary gear device 30 operates as a central differential. Accordingly, a full time four-wheel driving mode with the central differential function is established.

Figure 2:
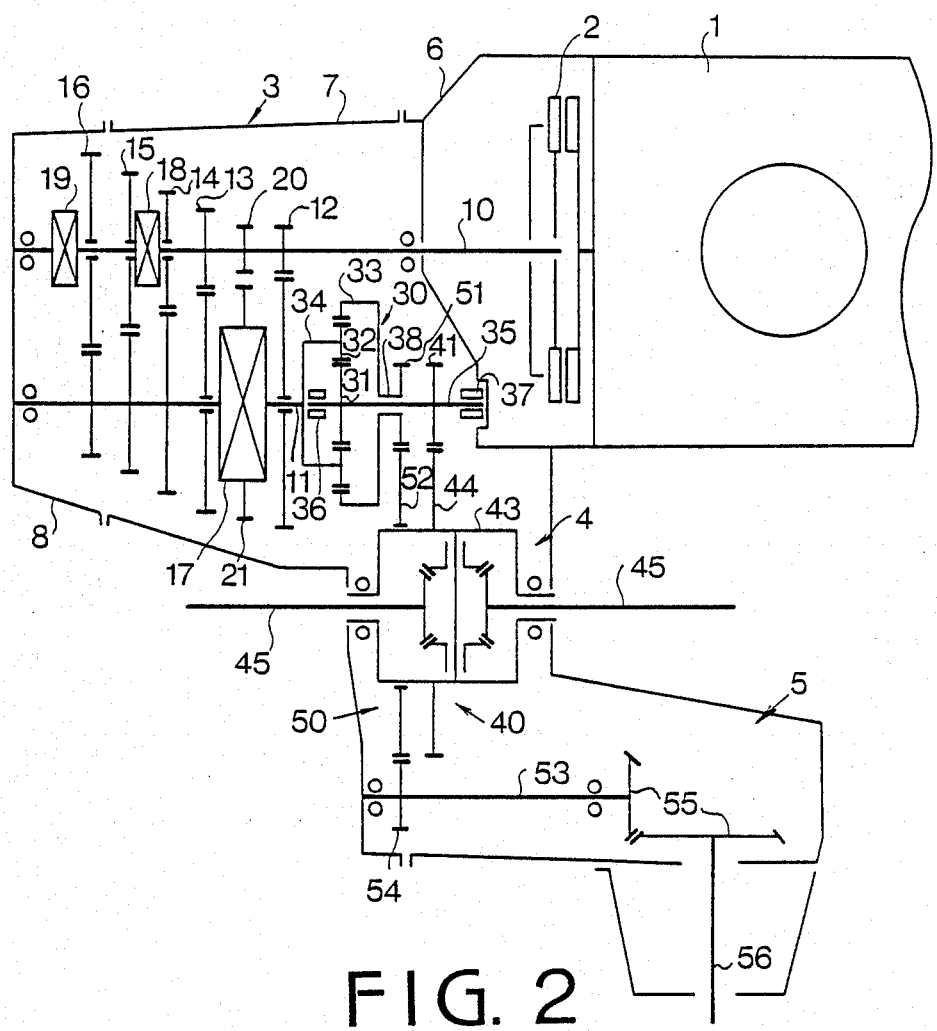
FIGS. 2 to 4 show schematic diagrams showing second to fourth embodiments of the present invention, respectively.
Figure 3:
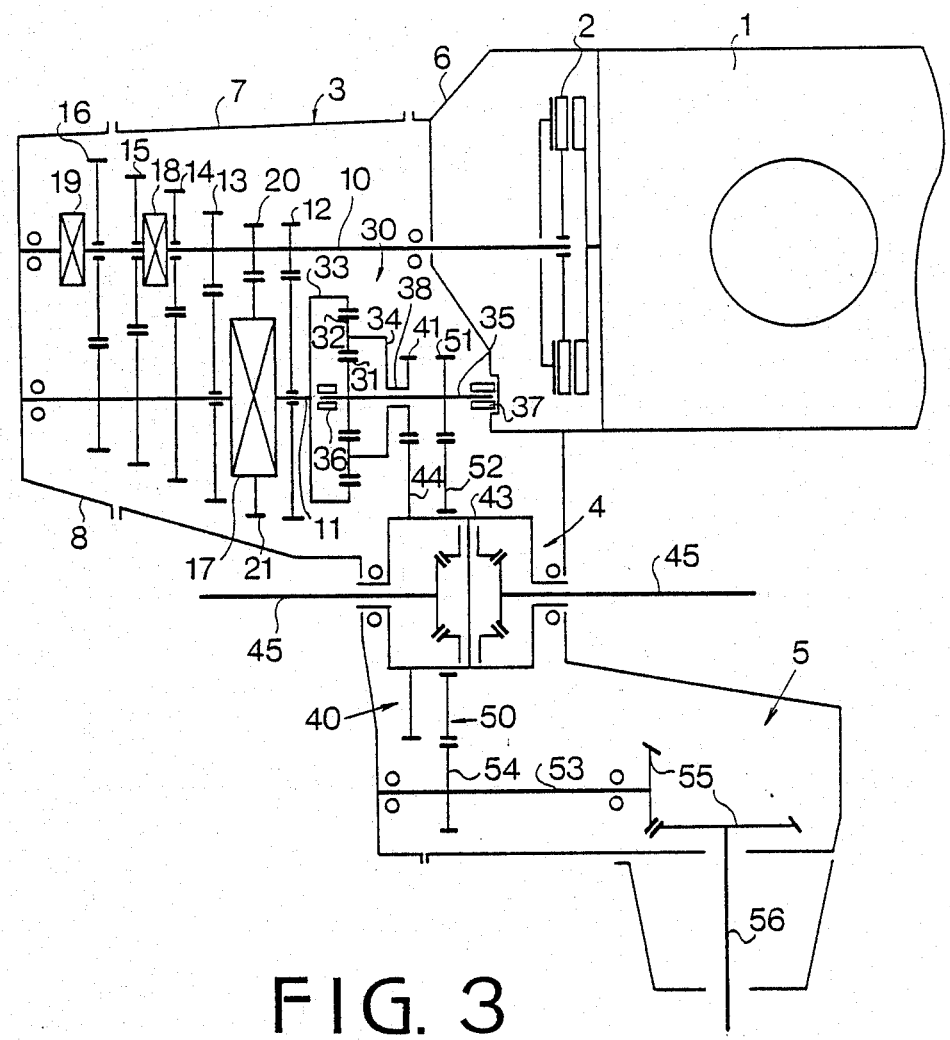
Figure 4:
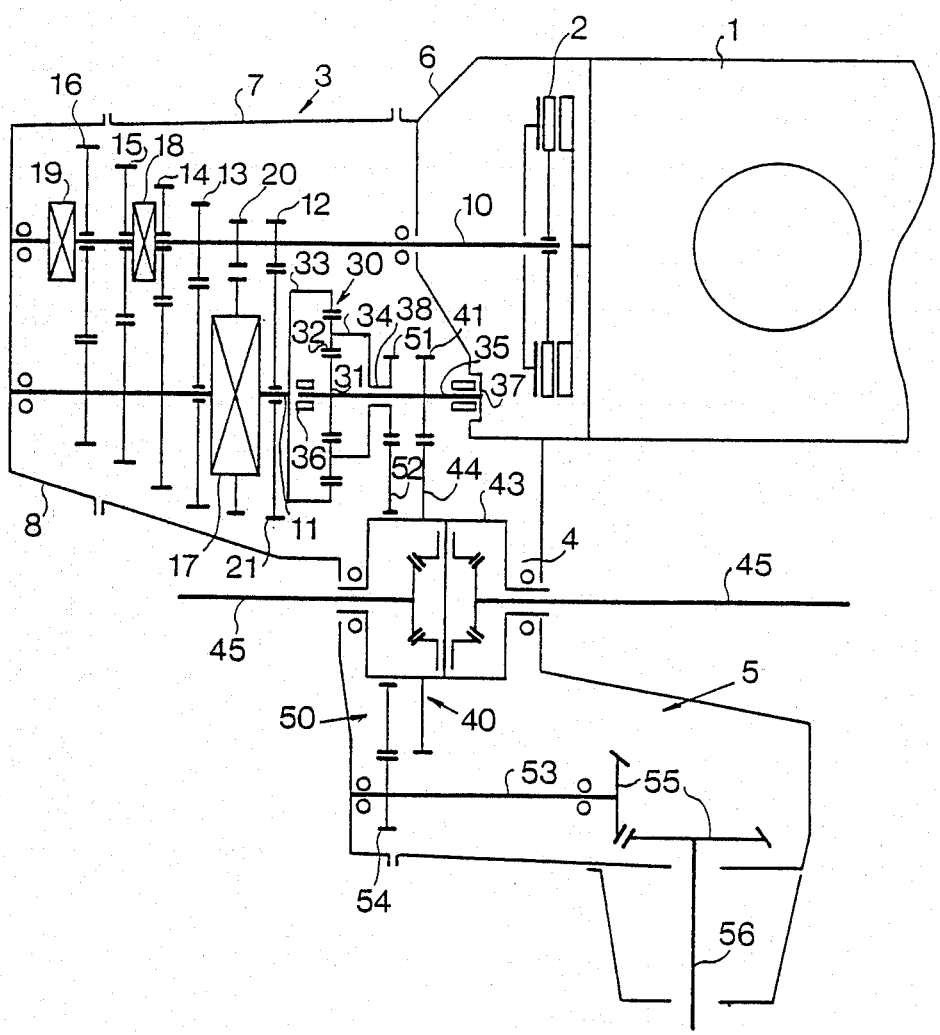

FIGS. 2 to 4 show other embodiments of the present invention. The same numerals of reference indicate the same parts in the figures.

Referring to FIG. 2, the construction of the transmission system is the same as the first embodiment except for some modifications in the transfer device 5. The ring gear 33 of the second embodiment is connected to the drive gear 51 of the transfer gear device 50 instead of to the drive gear 41 of the final reduction gear device 40. On the other hand, the drive gear 41 is fixedly mounted on the sun gear shaft 35. Thus, the torque is transmitted to the front wheels through the sun gear 31 and to the rear wheels through the ring gear 33.

In the third and fourth embodiments shown in FIGS. 3 and 4, respectively, the construction of the central differential 30 is modified to connect the output shaft 11 of the transmission 3 to the ring gear 33. As shown in FIG. 3, in the third embodiment, the carrier 34 is connected to the drive gear 41 of the final gears 40 so as to transmit the torque to the front wheels. The sun gear 31 is operatively connected to the transfer gear device 50 in the same manner as the first embodiment of FIG. 1, thereby transmitting the torque to the rear wheels. The carrier 34 in the fourth embodiment, shown in FIG. 4, is operatively connected to the transfer gear device 50. The sun gear 31, in return, is operatively connected to the final reduction gear device 40.

The present invention can be applied to a vehicle having engine, clutch and transmission mounted on the rear thereof.

From the foregoing, it will be understood that the present invention provides a transmission system having a central differential, disposed between the clutch and the transmission at a center of the vehicle so that power can be transmitted through gears without long shafts. Thus, the construction is greatly simplified, and the overdrive gears can be easily attached to the transmission. Since the central differential is disposed adjacent the final gears and the transfer gear device 50 in parallel to the final reduction gear device 40, lubrication for the central differential can be effected by splashes of oil.

While the presently preferred embodiments of the present invention have been shown and described, it is to be understood that this disclosure is for the purpose of illustration and that various changes and modifications may be made without departing from the spirit and scope of the invention as set forth in the appended claims.

What is claimed is:

1. In a power transmitting system for a four-wheel drive motor vehicle, having a transmission provided on a transmission case, the transmission disposed transversely relative to a longitudinal direction of the vehicle, and including an input shaft operatively connected to an output axle of an engine through a clutch provided in a clutch housing secured to the transmission case, and an output shaft including an end portion parallel with the input shaft, central differential means for enabling different rotating speeds between axle shafts and a drive shaft of the vehicle, the axle shafts including a right axle shaft and a left axle shaft, and a differential operatively connected to said right and left axle shafts for enabling different rotating speeds between the right and left axle shafts, the improvement of the system wherein said central differential means comprises input means coaxially connected with the end portion of the output shaft of the transmission, and two output means connected with the axle shafts through the differential, and operatively connected with the drive shaft, and said central differential means is mounted between the end portion of the output shaft of the transmission and the clutch housing and within the transmission case, thereby providing a simplified construction and reduced space occupied by the system.

2. The system according to claim 1, wherein the central differential means is a planetary gear device having a carrier as the input means, a ring gear as one of the two output means, and a sun gear as the other of the two output means.

3. The system according to claim 1, wherein the central differential means is a planetary gear device having a ring gear as the input means, a carrier as one of the two output means, and a sun gear as the other of the two output means.

4. The system according to claim 1, wherein one of the two output means engages with a first gear secured to the differential.

5. The system according to claim 1, wherein one of the two output means engages with a gear rotatably mounted on the differential and operatively connected to the drive shaft.

6. The system according to claim 4, wherein the other of the two output means engages with a second gear rotatably mounted on the differential.

7. The system according to claim 1, wherein said central differential means is disposed between said differential and said input shaft of the transmission in the longitudinal direction of the vehicle.

8. The system according to claim 5, wherein said central differential means is disposed between said differential and said input shaft of the transmission in the longitudinal direction of the vehicle.

9. The system according to claim 7, wherein said differential is disposed between said drive shaft and said central differential means substantially in the longitudinal direction of the vehicle.

10. The system according to claim 8, wherein said differential is disposed between said drive shaft and said central differential means substantially in the longitudinal direction of the vehicle.

* * * * *